United States Patent [19]
Myers

[11] Patent Number: 5,818,449
[45] Date of Patent: Oct. 6, 1998

[54] SYSTEM AND METHOD FOR RENAMING A WINDOW TITLE

[75] Inventor: Stephen Vincent Myers, Sacramento, Calif.

[73] Assignee: MCI Corporation, Washington, D.C.

[21] Appl. No.: 667,312

[22] Filed: Jun. 21, 1996

[51] Int. Cl.[6] .................................................. G06F 3/00
[52] U.S. Cl. ............................................................ 345/343
[58] Field of Search .................................. 395/326–358; 345/117–120, 326–358

[56] References Cited

U.S. PATENT DOCUMENTS 5,473,745  12/1995  Berry et al. .............................. 345/340
5,586,244  12/1996  Berry et al. .............................. 395/340

OTHER PUBLICATIONS

Simpson, "Mastering Wordperfect 5.1 & t.2 for Windows", Sybex Inc., pp. 7, 19–23, 37–39, 1069–1071, 1993.

*Primary Examiner*—John E. Breene

[57] ABSTRACT

A system and method for renaming a title of a window that has been created and is currently displayed on a computer screen. When a user wants to rename a window's title, the user first brings the window into focus; that is, he makes the desired window the active window. The user then presses a hot-key, or key combination. Upon receiving the hot-key, the present invention displays a pop-up window prompting the user for a new window title. After entering the text for the new window title, the present invention changes the title of the active window to the new title that the user entered. In addition, the present invention ensures that the new title is reflected in a task list of executing applications.

12 Claims, 6 Drawing Sheets

SYSTEM AND METHOD FOR RENAMING A WINDOW TITLE

BACKGROUND OF THE INVENTION

1. Field of the Invention

This invention relates to computer window environments, and more specifically, to a computer system and method that controls the renaming of a window title.

2. Related Art

Computer systems have become increasingly user friendly by employing a window type of user interface. The power of a window environment is based on the fact that a user can create and access multiple windows at one time, each with a different function. A window manager maintains a list of windows created by all executing applications. The window manager associates windows with the applications in which they are created.

To better understand this invention, it is useful to describe some additional terminology relating to windows. A window specifies an area of a computer screen, normally rectangular in shape, that an application dedicates to a specific function. The window provides a means for visually interfacing with a user. The window's maximum extent covers the entire rectangular area including the window's border if it has one. A window typically has a title bar located across the top border of the window. In conventional systems, the window manager is responsible for assigning the window a title and displaying that title in the window's title bar.

One of the disadvantages of having the window manager choose a window's title is exemplified when a user creates and accesses multiple DOS and OS/2 command windows. Both DOS and OS/2 are computer operating systems for an Intel microprocessor based computer system. In this circumstance, the window manager assigns all of the command windows the same window title. Therefore, it is very confusing and awkward for the user to manage multiple windows because there is no quick and easy way to identify one command window from another.

In conventional window environments, there is no method or mechanism for allowing a user to change a window's title after the window has been created. There are, however, ways for a user to select a window's title prior to creation of the window, but the user requires specific knowledge. Therefore, there is a need for a system and method that allows a user to change a window's title after the window has been created.

SUMMARY OF THE INVENTION

The present invention solves the current problem of multiple windows having the same window title by providing a system and method for a user to change a window's title after the window has been created. When a user wants to rename a window's title, the user first brings that window into focus; that is, he makes the desired window the active window. The user then presses a hot-key, or key combination. Upon receiving the hot-key, the present invention displays a pop-up window prompting the user for a new window title. After entering the text for the new window title, the user presses the Enter key. The present invention then changes the window title of the active window to the new title that the user entered.

In addition to displaying the new title of the active window, the present invention also reflects the new title in the task list. Therefore, when the user opens the task list, the task list provides a list of current window titles for all of the icons and open windows being displayed, including the new title as changed by the user.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview of the preferred embodiment of the present invention

Figure 1:
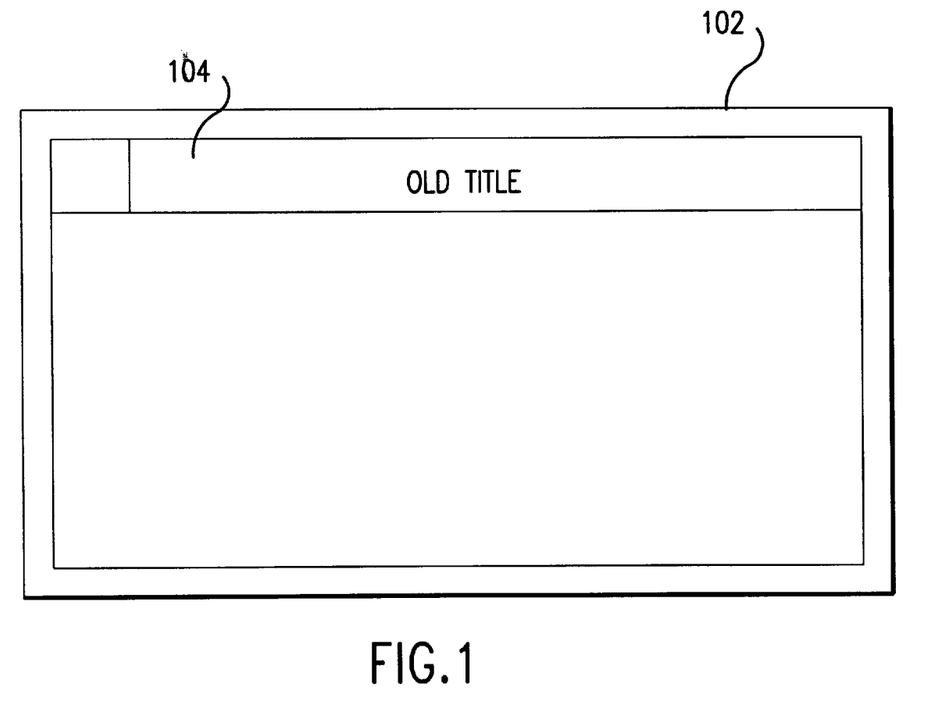
FIG. 1 is a block diagram illustrating a window with a title bar containing an old title.

The present invention provides a system and method for a user to change a window's title after the window has been created. When a user wants to rename a window's title, the user first brings the desired window into focus and makes it the active window. FIG. 1 is a block diagram representing an active window 102 in which the user wants to change the title. This active window 102 contains an old title 104. The user then presses a hot-key, or key combination to invoke the present invention of renaming the old title 104 of the active window 102.

Figure 2:
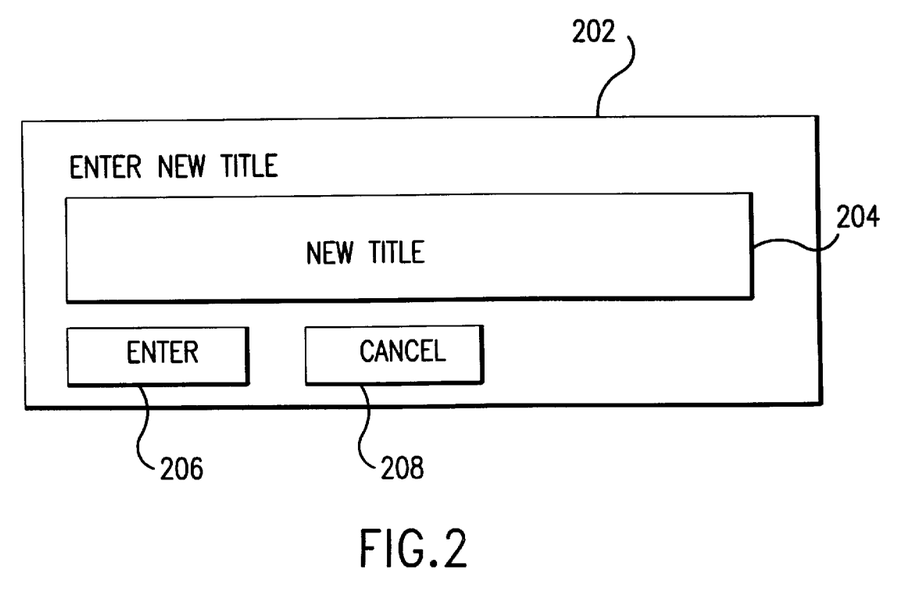
FIG. 2 is a block diagram illustrating a pop-up window prompting a user for a new window title.

Upon receiving the hot-key, the present invention displays a pop-up window prompting the user for a new window title. FIG. 2 is a block diagram illustrating the pop-up window 202. The pop-up window 202 comprises a new title box 204 into which the user may type the text of a new window title, an enter button 206, and a cancel button 208. The user presses the enter button 206 to invoke the present invention and perform the title change of the active window 102. More specifically, when the user presses the enter button 206, the present invention takes the text in the new title box 204 and displays it as the new title of the active window 102. The user may press the cancel button 208 to cancel the hot-key command; therefore, exiting processing without changing the old title 104 of the active window 102.

Figure 3:
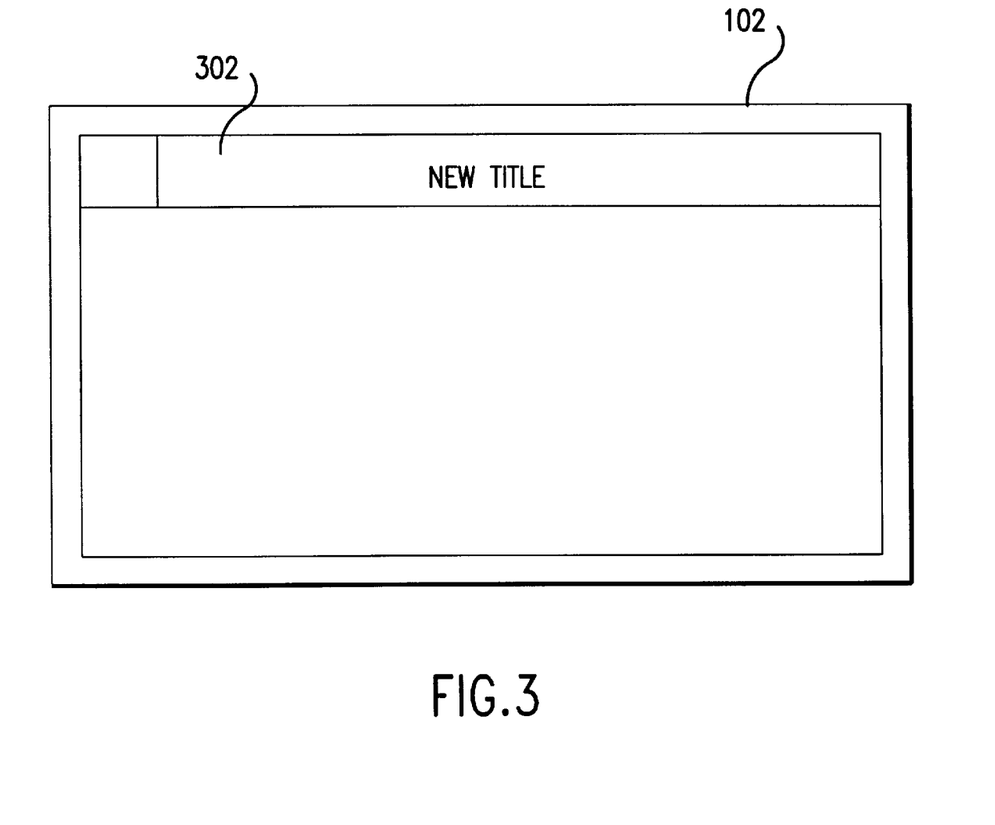
FIG. 3 is a block diagram illustrating the window with a title bar containing a new title.

After entering the text for the new title 204 and the user presses the enter button 206, the old title 104 of the active window 102 is renamed to the text in the new title box 204. FIG. 3 is a block diagram illustrating the active window 102 with the new title 302.

2. Host system of a preferred environment for the present invention

Figure 4:
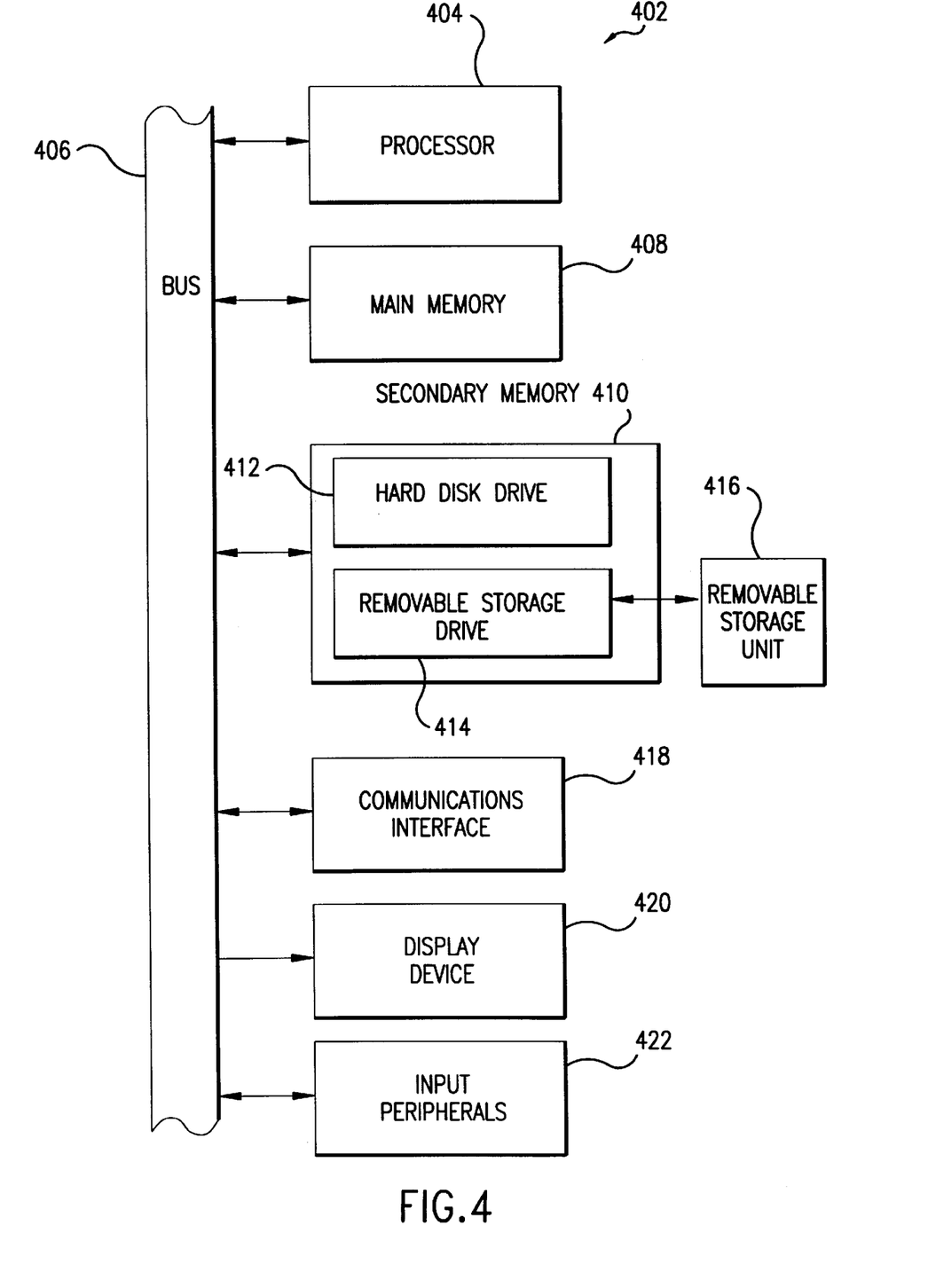
FIG. 4 is a block diagram of an exemplary computer system in which the present invention executes.

The chosen embodiment of the present invention is computer software executing within a computer system. FIG. 4 shows an exemplary computer system. The computer system 402 includes one or more processors, such as a processor 404. The processor 404 is connected to a communication bus 406.

The computer system 402 also includes a main memory 408, preferably random access memory (RAM), and a secondary memory 410. The secondary memory 410 includes, for example, a hard disk drive 412 and/or a removable storage drive 414, representing a floppy disk drive, a magnetic tape drive, a compact disk drive, (4.a) displaying to said user a user input pop-up window in which said user can enter said new title; and (4.b) receiving from said user an enter command for entering said new title or a cancel command for canceling said new title; a program cartridge and cartridge interface (such as that found in video game devices), a removable memory chip (such as EPROM, or PROM), etc. which is read by and written to by a removable storage unit 416. Removable storage unit 416, also called a program storage device or a computer program product, represents a floppy disk, magnetic tape, compact disk, etc. As will be appreciated, the removable storage unit 416 includes a computer usable storage medium having stored therein computer software and/or data. The removable storage drive 414 reads from and/or writes to a removable storage unit 416 in a well known manner.

The computer system 402 may also include other similar means for allowing computer programs or other instructions to be loaded. Such means can include, for example, a communications interface 418. Communications interface 418 allows software and data to be transferred between computer system 402 and external devices. Examples of communications interface 418 can include a modem, a network interface (such as an Ethernet card), a communications port, etc. Software and data transferred via communications interface 418 are in the form of signals which can be electronic, electromagnetic, optical or other signals capable of being received by communications interface 418.

In this document, the term "computer program product" is used to generally refer to removable storage unit 416, a hard disk installed in hard disk drive 412, and signals transferred via communications interface 418. These computer program products are means for providing software to a computer system 402.

In an embodiment where the invention is implemented using software, the software may be stored in main memory 408, or in a computer program product and loaded into computer system 402 using removable storage drive 414, hard disk drive 412, or communications interface 418. The software, when executed by the processor 404, causes the processor 404 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 402 using the OS/2 operating system. OS/2 is available from International Business Machines Corporation (IBM) and is well known in the relevant arts. The preferred embodiment of the present invention is implemented in software, and more specifically, is written in the programming language C. The preferred embodiment is described in these terms for convenience purpose only. Other comparable computer systems 402, operating systems, and programming languages could alternatively be used.

The preferred embodiment of the present invention is also directed to a computer system 402 including a display device 420 and one or more input peripherals 422. The display device 420 represents a computer screen or monitor on which a graphical user interface, including a window environment, may be displayed. The input peripherals 422 include, for example, a keyboard, a mouse, a light pen, a pressure-sensitive screen, etc., which provide a user with the capability of entering input to the computer system 402.

3. Hierarchial interfaces of the present invention

Figure 5:
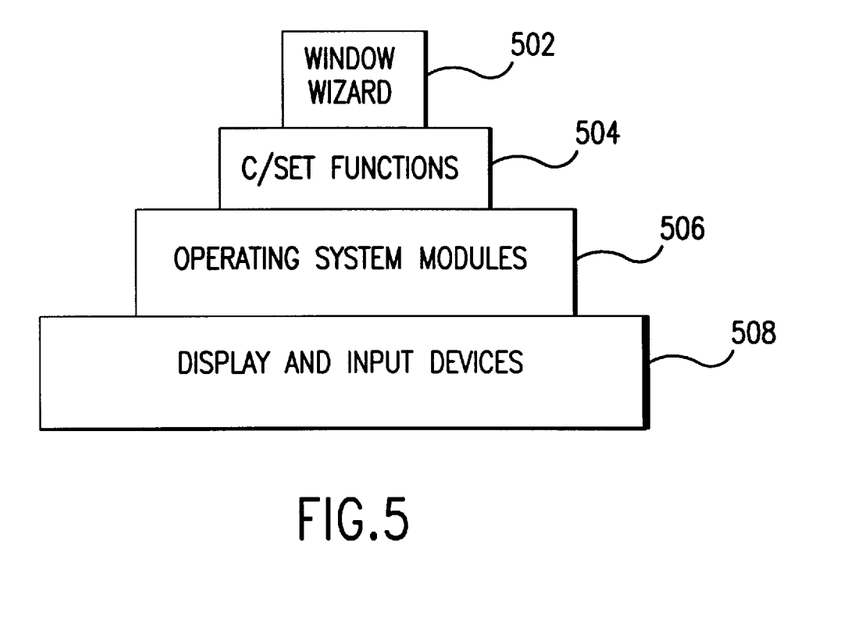
FIG. 5 is a block diagram illustrating the hierarchy of interfaces of the preferred embodiment of the present invention.

As described above, the preferred embodiment of the present invention is computer software written in the programming language C. For description purposes only, the computer software of the present invention comprises a software executable image entitled Window Wizard. FIG. 5 is a block diagram illustrating the hierarchial interfaces of the Window Wizard 502.

The Window Wizard 502 is a C program that interfaces with C/Set functions 504. That is, the Window Wizard 502 invokes various C/Set functions 504 to access and manipulate the windows displayed on a computer screen and to receive input commands from a keyboard, mouse, or alternate input device. The C/Set functions 504 are well known in the relevant art and are available from IBM. The IBM C compiler provides on-line detailed descriptions of the C/Set functions 504, their parameters, and examples of how to invoke the functions.

The C/Set functions 504 interface with the operating system modules 506 of the host computer 402. As described above, the preferred embodiment of the Window Wizard 502 comprises the OS/2 operating system. Therefore, the C/Set functions 504 invoke various OS/2 operating system modules 506 to access the windows and input devices. The operating system modules 506 are low-level functions that have a direct interface with the particular display and input devices 508 of the computer system 102.

4. Control flow of the present invention

Figure 6:
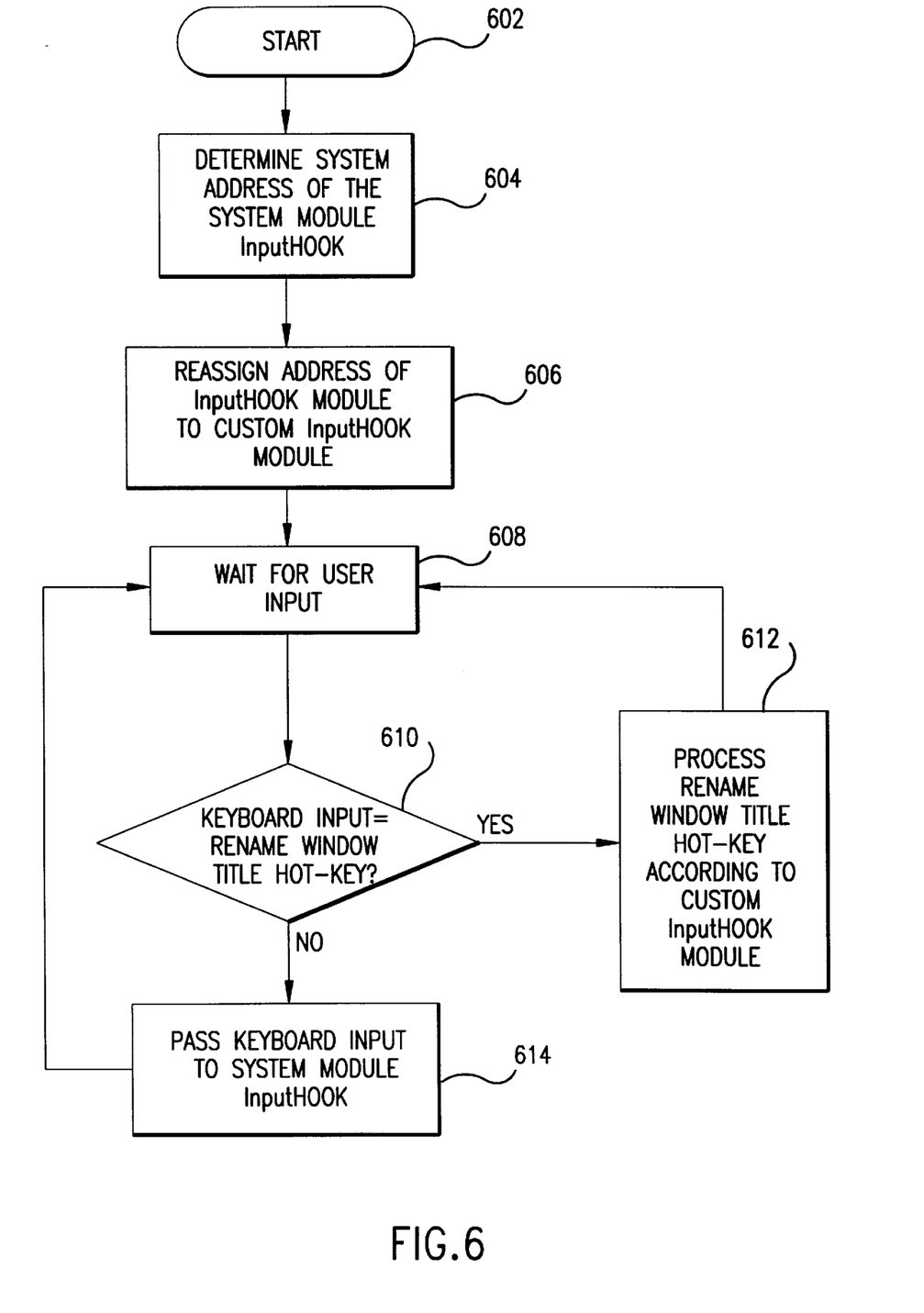
FIG. 6 is a control flow diagram illustrating the high-level operation of the present invention.

FIG. 6 is a control flow diagram illustrating the high-level operation of the window wizard 502. At start-up of the computer system 102, the window wizard 502 starts at step 602 and immediately proceeds to step 604. In step 604, the window wizard 502 determines the system address of the operating system module 506 entitled InputHook. More specifically, the window wizard 502 invokes the C/Set function 504 entitled DosQueryProcAddr to determine the system address of InputHook. InputHook is an operating system module 506 that captures keyboard and mouse inputs from the user. The window wizard then proceeds to step 606.

In step 606, the window wizard 502 reassigns the system address of InputHook to a custom InputHook module. More specifically, the window wizard 502 invokes the C/Set function 504 entitled SetInputHook. SetInputHook allows the window wizard 502 to reroute all keyboard and mouse events to the custom InputHook module. In the preferred embodiment, the custom InputHook module is contained in a Hooks.DLL file which is an OS/2 Dynamic Link Library (DLL). The Hooks.DLL file is compiled and linked with the window wizard 502, providing compiler directives. DLL files are well known to persons of ordinary skill in the art. The window wizard 502 then proceeds to step 608.

In step 608, the window wizard 502 waits for user input via an input peripheral 422. In this circumstance, the user input comprises a keystroke, combination of keystrokes, mouse selection, or any alternate method of input. Upon receiving a user input, the window wizard 502 proceeds to step 610. In step 610, the window wizard 502 determines whether the user input is the hot-key, or key combination, for invoking the renaming of the title 104 of an active window 102 on the display device 420. The preferred embodiment of the window wizard 502 comprises the use of a hot-key for invoking the function of renaming a window's title. This is for convenience purpose only. It would be readily apparent to one skilled in the relevant art to use an alternative user input for invoking the window wizard 502.

In step 610, if the window wizard 502 determines that the user input is the hot-key for renaming the old title 104 of an active window 102 on the display device 420 the window wizard 502 proceeds to step 612. In step 612, the window wizard 502 processes the function of renaming the old title 104 of the active window 102. Step 612 is described in greater detail below. After processing the hot-key, the window wizard 502 returns to step 608 and waits for the next user input.

Referring again to step 610, if the user input was not the hot-key for renaming the old title 104 of an active window 102, the window wizard 502 proceeds to step 614. In step 614, the window wizard 502 passes the user input to the original operating system module 506 entitle InputHook. In this circumstance, the window wizard 502 does not execute its custom version of the InputHook module, but rather, executes the default operating system module. After passing the input to the InputHook module, the window wizard 502 returns to step 608 and waits for the next user input.

Figure 7:
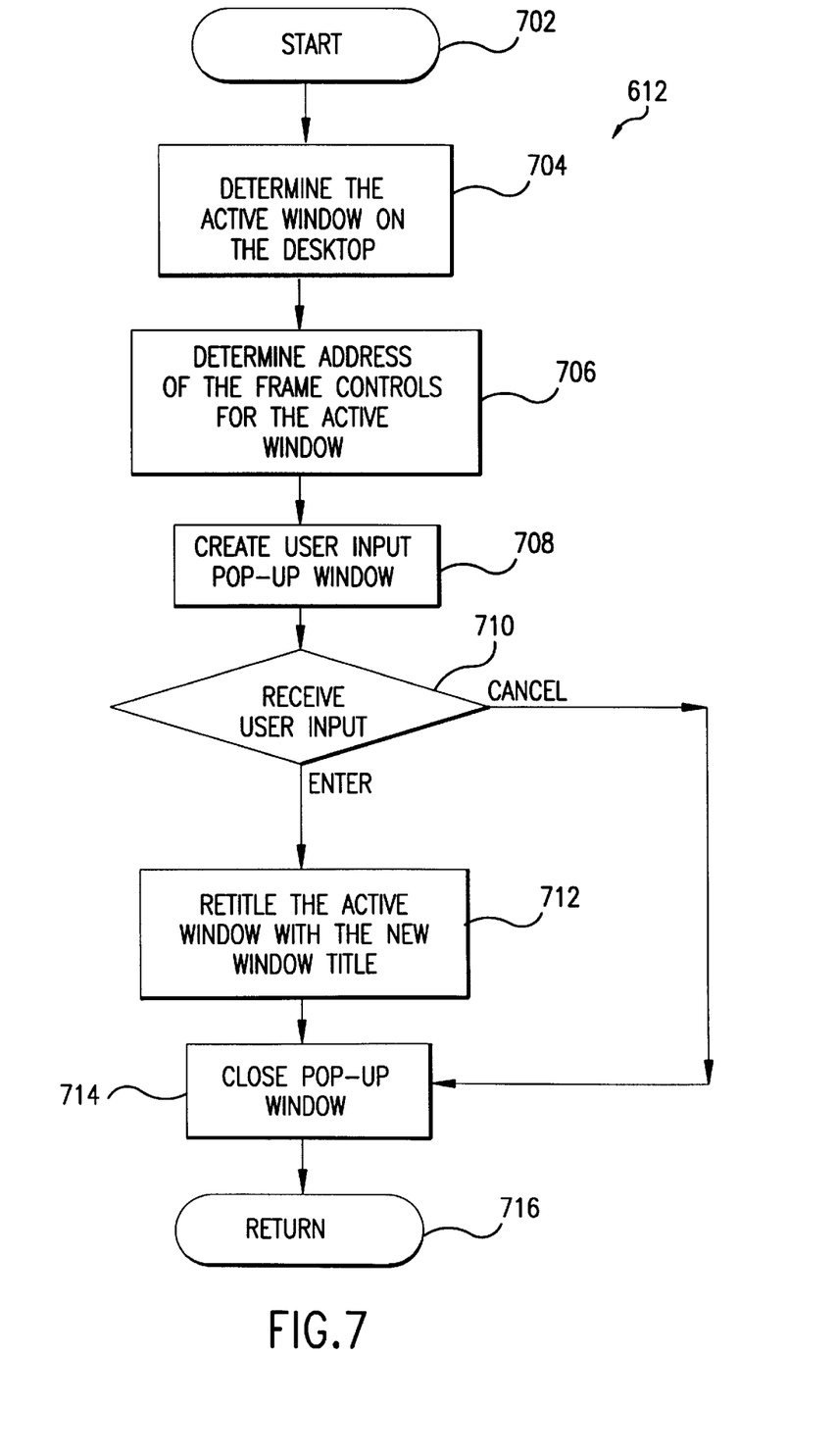
FIG. 7 is a control flow diagram illustrating the processing of a hot-key that invokes the function of renaming a window title.

FIG. 7 is a control flow diagram illustrating the operation of step 612 and the process for renaming the old title 104 of the active window 102 to a new title 302. Processing begins at step 702 and immediately proceeds to step 704. In step 704, the window wizard 502 determines the active window 102 on the desktop. More specifically, the window wizard 502 invokes the C/Set function 504 entitled WinQueryFocus (HWND$_{13}$DESKTOP) to find the active window 102. The window wizard continues to step 706. In step 706, the window wizard 502 retrieves the address of the frame controls for the active window 102. More specifically, the window wizard 502 invokes the C/Set function 504 entitled WinQueryWindow. The frame controls provide the window wizard 502 with access to the old title 104 of the active window 102.

Continuing to step 708, the window wizard 502 creates a user input pop-up window 202. As described above, the preferred embodiment of the user input pop-up window 202 comprises a new title box 204, an enter button 206, and a cancel button 208. It would be readily apparent to one skilled in the relevant art to create and manage a user input pop-up window 202, or a comparable user input pop-up window 202 of an alternate design. The window wizard 502 then continues to step 710.

In step 710, the window wizard 502 determines whether the user pressed the enter button 206 or the cancel button 208. If the user did not press the enter button 206, but rather pressed the cancel button 208, the window wizard 502 proceeds to step 714. In step 714, the window wizard 502 closes the user input pop-up window 202 in a well-known manner. The window wizard 502 then continues to step 716 in which the window wizard 502 returns processing back to step 612 in FIG. 6 without renaming the old title 104 of the active window 102.

Referring again to step 710, if the window wizard 502 determines that the user did press the enter button 206, the window wizard 502 proceeds to step 712. In step 712, the window wizard 502 renames the old title 104 of the active window 102 with the text entered in the new title box 204 of the user input pop-up window 202. More specifically, the window wizard 502 invokes the C/Set function 504 entitled WinSetWindowText to rename the active window 102 with the new title 302. The widow wizard 502 also invokes the C/Set function 504 WinChangeSwitchEntry to rename the title of the active window 102 in the task list. A task list is a window that provides a user with a list of currently executing programs; that is, a list of all icons and open windows currently being displayed. Task lists are well known in the art. For example, Microsoft Windows provides a task list when a user presses the key combination Control-Escape. Therefore, when a user opens a task list, the list includes the new title 302 for the active window 102. Upon completion of step 712, the window wizard 502 provides a user with a complete title change for the active window 102. The new title 302 is displayed on the active window 102 and in the task list.

After the active window 102 has been renamed with the new title 302, the window wizard 502 continues to step 714. In step 714, the window wizard 502 closes the user input pop-up window 202 in a well known manner. The window wizard 502 then continues to step 716 in which the window wizard 502 returns processing back to step 612 in FIG. 6, thereby returning to step 608 to wait for the next user input.

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A system for renaming a title of an arbitrary window, wherein the window is created and displayed on a computer screen, comprising:
    a first receiving means for receiving a user-generated command;
    a first determining means for determining whether said user-generated command is a command to rename the title of a window;
    a second determining means for determining an active window on the computer screen;
    a second receiving means for receiving from said user a new title for said active window; and
    a displaying means for displaying said active window with said new title on the computer screen;
    wherein said second determining means, said second receiving means, and said displaying means are executed if said first determining means determines that said user-generated command is said command to rename the title of a window.

2. The system according to claim 1, wherein said command to rename the title of a window comprises a hot-key.

3. The system according to claim 1, wherein said second receiving means comprises:
    a pop-up window means for displaying to said user a user input pop-up window in which said user can enter said new title; and
    a third receiving means for receiving from said user an enter command for entering said new title or a cancel command for canceling said new title;
    wherein said displaying means executes if said third receiving means receives said enter command.

4. The system according to claim 1, further comprising:

a second displaying means for displaying said new title of said active window in a task list.

5. A method for renaming a title of an arbitrary window, wherein the window is created and displayed on a computer screen, comprising the steps of:

(1) receiving a user-generated command;

(2) determining whether said user-generated command is a command to rename the title of a window;

(3) determining an active window on the computer screen;

(4) receiving from said user a new title for said active window; and (5) displaying said active window with said new title on the computer screen;

wherein steps (3), (4), and (5) are executed if it is determined in step (2) that said user-generated command is said command to rename the title of a window.

6. The method according to claim 5, wherein said command to rename the title of a window comprises a hot-key.

7. The method according to claim 5, wherein step (4) comprises:

(4.a) displaying to said user a user input pop-up window in which said user can enter said new title; and (4.b) receiving from said user an enter command for entering said new title or a cancel command for canceling said new title;

wherein step (5) is executed if step (4.b) receives said enter command.

8. The method according to claim 5, further comprising:

(5) displaying said new title of said active window in a task list.

9. A computer program product for use with a computer system, comprising:

a computer usable medium having computer readable program code means embodied in said medium for enabling a processor to rename a title of an arbitrary window, wherein the window is created and displayed on a computer screen, said computer program product having:

first computer readable program code means for enabling the processor to receive a user-generated command;

second computer readable program code means for enabling the processor to determine whether said user-generated command is a command to rename the title of a window;

third computer readable program code means for enabling the processor to determine an active window on the computer screen;

fourth computer readable program code means for enabling the processor to receive from said user a new title for said active window; and fifth computer readable program code means for enabling the processor to display said active window with said new title on the computer screen;

wherein said third computer readable program code means, said fourth computer readable program code means, and said fifth computer readable program code means are executed if said second computer readable program code means determines that said user-generated command is said command to rename the title of a window.

10. The computer program product according to claim 9, wherein said command to rename the title of a window comprises a hot-key.

11. The computer program product according to claim 9, wherein said fourth computer readable program code means comprises:

a pop-up window means for enabling the processor to display to said user a user input pop-up window in which said user can enter said new title; and a receiving means for enabling the processor to receive from said user an enter command for entering said new title or a cancel command for canceling said new title;

wherein said fourth computer readable program code means executes if said receiving means receives said enter command.

12. The computer program product according to claim 9, further comprising:

fifth computer readable program code means for enabling the processor to display said new title of said active window in a task list.

* * * * *